United States Patent
Gu et al.

(10) Patent No.: US 10,203,832 B2
(45) Date of Patent: Feb. 12, 2019

(54) COLOR FILM SUBSTRATE, MANUFACTURING METHOD THEREOF AND DISPLAY DEVICE

(71) Applicants: Boe Technology Group Co., Ltd., Beijing (CN); Hefei Boe Optoelectronics Technology Co., Ltd., Hefei, Anhui (CN)

(72) Inventors: Honggang Gu, Beijing (CN); Xiaohe Li, Beijing (CN); Xianjie Shao, Beijing (CN); Qinghua Jiang, Beijing (CN)

(73) Assignees: BOE TECHNOLOGY GROUP CO., LTD., Beijing (CN); HEFEI BOE OPTOELECTRONICS TECHNOLOGY CO., LTD., Hefei, Anhui (CN)

( * ) Notice: Subject to any disclaimer, the term of this patent is extended or adjusted under 35 U.S.C. 154(b) by 170 days.

(21) Appl. No.: 15/122,572

(22) PCT Filed: Aug. 12, 2015

(86) PCT No.: PCT/CN2015/086762
§ 371 (c)(1),
(2) Date: Aug. 30, 2016

(87) PCT Pub. No.: WO2016/169159
PCT Pub. Date: Oct. 27, 2016

(65) Prior Publication Data
US 2018/0164927 A1    Jun. 14, 2018

(30) Foreign Application Priority Data
Apr. 20, 2015 (CN) .......................... 2015 1 0188956

(51) Int. Cl.
*G06F 3/041*    (2006.01)
*G06F 3/047*    (2006.01)
(Continued)

(52) U.S. Cl.
CPC ............. *G06F 3/047* (2013.01); *G02B 5/285* (2013.01); *G02B 5/286* (2013.01); *G06F 3/041* (2013.01);
(Continued)

(58) Field of Classification Search
CPC ................................ G06F 3/047; G02B 5/285
(Continued)

(56) References Cited

U.S. PATENT DOCUMENTS

2002/0101399 A1* 8/2002 Kubo ................... G02F 1/13338
345/104
2004/0166362 A1    8/2004 Utsumi et al.
(Continued)

FOREIGN PATENT DOCUMENTS

CN    2002175880 A    6/2002
CN    101825791 A    9/2010
(Continued)

OTHER PUBLICATIONS

Office Action in Chinese Application No. 201510188956.3 dated Apr. 6, 2017, with English translation. 15 pages.
(Continued)

*Primary Examiner* — Prabodh M Dharia
(74) *Attorney, Agent, or Firm* — Womble Bond Dickinson (US) LLP

(57) ABSTRACT

A color film substrate, manufacturing method thereof and a display device are provided. The color film substrate includes: a basal substrate, a color film layer formed on the basal substrate, a transparent insulating layer formed on a light output surface of the color film layer, and a touch electrode wire pattern formed on a light output surface of the transparent insulating layer; the refractive index of the transparent insulating layer is consistent with the refractive index of the touch electrode wire pattern. The color film
(Continued)

substrate provided effectively weakens the brightness difference line caused by the touch electrode wire pattern.

17 Claims, 1 Drawing Sheet

(51) Int. Cl.
*G02B 5/28* (2006.01)
*G02B 5/20* (2006.01)

(52) U.S. Cl.
CPC .............. *G02B 5/201* (2013.01); *G02B 5/206* (2013.01); *G06F 2203/04103* (2013.01)

(58) Field of Classification Search
USPC ............ 345/156–184; 349/12, 194; 313/506; 257/40
See application file for complete search history.

(56) References Cited

U.S. PATENT DOCUMENTS

| | | | | |
|---|---|---|---|---|
| 2005/0099118 | A1* | 5/2005 | Kobayashi | H01L 27/3211 313/506 |
| 2011/0098240 | A1* | 4/2011 | Dugi | A61K 31/522 514/32 |
| 2011/0304563 | A1* | 12/2011 | Cheng | G06F 3/0412 345/173 |
| 2012/0182254 | A1* | 7/2012 | Jang | G06F 3/03545 345/174 |
| 2012/0206664 | A1* | 8/2012 | Brown | G06F 3/0412 349/12 |
| 2012/0249441 | A1 | 10/2012 | Lee et al. | |
| 2013/0044074 | A1* | 2/2013 | Park | G02F 1/13338 345/174 |
| 2013/0293824 | A1* | 11/2013 | Yoneyama | B32B 7/12 349/194 |
| 2014/0036181 | A1* | 2/2014 | Kamon | H05K 1/118 349/33 |
| 2014/0232951 | A1 | 8/2014 | Ueda et al. | |
| 2014/0247239 | A1* | 9/2014 | Jamshidi-Roudbari | G06F 3/0414 345/174 |
| 2015/0115247 | A1* | 4/2015 | Nishimura | G02B 5/0226 257/40 |
| 2015/0145816 | A1* | 5/2015 | Ueda | C23C 14/083 345/174 |
| 2015/0177879 | A1* | 6/2015 | Misaki | H05K 1/0306 345/174 |
| 2016/0109977 | A1* | 4/2016 | Hashimoto | G06F 3/044 345/174 |
| 2017/0115446 | A1* | 4/2017 | Hirayama | G02B 6/0053 |

FOREIGN PATENT DOCUMENTS

| | | |
|---|---|---|
| CN | 202145304 U | 2/2012 |
| CN | 102455837 A | 5/2012 |
| CN | 102735764 A | 10/2012 |
| CN | 103443748 A | 12/2013 |
| CN | 203480453 u | 3/2014 |
| CN | 203930739 U | 11/2014 |
| CN | 203982347 U | 12/2014 |
| CN | 104765500 A | 7/2015 |

OTHER PUBLICATIONS

International Search Report and Written Opinion in PCT/CN2015/086762 dated Jan. 18, 2016, with English translation. 15 pages.
Office Action received for Chinese Patent Application No. 201510188956.3, dated Nov. 27, 2017, 19 pages (11 pages of English Translation and 8 pages of Office Action).
International Preliminary Report on Patentability received for PCT Patent Application No. PCT/CN2015/086762, dated Nov. 20, 2017, 13 pages (8 pages of English Translation and 5 pages of Original Document).

* cited by examiner

-prior art-

COLOR FILM SUBSTRATE, MANUFACTURING METHOD THEREOF AND DISPLAY DEVICE

RELATED APPLICATIONS

The present application is the U.S. national phase entry of PCT/CN2015/086762, with an international filing date of Aug. 12, 2015, which claims the benefit of Chinese Patent Application No. 201510188956.3, filed on Apr. 20, 2015, the entire disclosures of which are incorporated herein by reference.

FIELD OF THE INVENTION

The present invention relates to the field of display technology, particularly to a color film substrate, manufacturing method thereof and a display device.

BACKGROUND OF THE INVENTION

With the rapid progress of display technology, the display device with touch function has been more and more popular because of its advantages such as visualized operation. Based on the relative position of the touch panel and the display panel, the existing display device with touch function mainly comprises the on cell type touch panel and the in cell type touch panel.

FIG. 1 shows a schematic diagram of a color film substrate in a typical on cell type touch panel in the prior art. The color film substrate comprises a basal substrate 1, a colorful film layer 2 formed on the lower surface of the basal substrate 1, and a touch electrode wire pattern 3 formed on the upper surface of the basal substrate 1. In the practical application, the touch electrode wire pattern 3 is typically manufactured with ITO material, of which the refractive index is 2. For this reason, the light passing through the ITO material will be shifted to the left, while the light without passing through the ITO material will be refracted directly, and will not be shifted to the left. Therefore, for the right region of the touch electrode wire pattern 3, the light passing through this region should be shifted to the left, while the light passing through the right periphery of this region should not be shifted to the left since it does not pass through the touch electrode wire pattern 3, thereby causing light loss in this region, forming a dark area as shown in the figure. Accordingly, the light passing through the left periphery of the left region of the touch electrode wire pattern 3 will not be shifted to the left, and will overlap with the light shifted to this position due to the touch electrode wire pattern 3, forming a bright area as shown in the figure. This will cause a brightness difference line in the display image.

SUMMARY OF THE INVENTION

The embodiments of the present invention provide a color film substrate, manufacturing method thereof and a display device, weakening the brightness difference line caused by the touch electrode wire pattern.

In a first aspect, an embodiment of the present invention provides a color film substrate. The color film substrate comprises a basal substrate, a color film layer formed on the basal substrate, a transparent insulating layer formed on a light output surface of the color film layer, and a touch electrode wire pattern formed on a light output surface of the transparent insulating layer; the refractive index of the transparent insulating layer is consistent with the refractive index of the touch electrode wire pattern.

Optionally, the color film layer is formed on a first surface of the basal substrate; the transparent insulating layer is formed on a second surface of the basal substrate departing from the color film layer.

Optionally, the thickness of the transparent insulating layer is $N\lambda/4n$, where N is an odd number, $\lambda$ is the central wavelength of the output light, and n is the refractive index of the transparent insulating layer.

Optionally, the thickness of regions of the transparent insulating layer corresponding to regions of the color film layer with different colors is $N\lambda/4n$ respectively, where N is an odd number, $\lambda$ is the central wavelength of respective light passing through the regions of the color film layer with different colors, and n is the refractive index of the transparent insulating layer.

Optionally, the transparent insulating layer is manufactured with a material mixed with a $Nb_2O_5$ material and a $SiO_2$ material. Optionally, the $Nb_2O_5$ material comprises $Nb_2O_5$ particles with a diameter of 6 nm, and the $SiO_2$ material comprises $SiO_2$ particles with a diameter of 40 nm.

Optionally, the color film substrate further comprises a planarization layer; the planarization layer covers a light output surface of the touch electrode wire pattern and the light output surface of the transparent insulating layer.

In a second aspect, an embodiment of the present invention provides a method for manufacturing the above mentioned color film substrate. The method comprises: forming a color film layer on a basal substrate; forming a transparent insulating layer on a light output surface of the color film layer; and forming a touch electrode wire pattern on a light output surface of the transparent insulating layer; the refractive index of the transparent insulating layer is consistent with the refractive index of the touch electrode wire pattern.

Optionally, forming a transparent insulating layer on a light output surface of the color film layer comprises: forming a transparent insulating layer on a surface of the basal substrate departing from the color film layer.

Optionally, the thickness of the transparent insulating layer is $N\lambda/4n$, where N is an odd number, $\lambda$ is the central wavelength of the output light, and n is the refractive index of the transparent insulating layer.

Optionally, the thickness of regions of the transparent insulating layer corresponding to regions of the color film layer with different colors is $N\lambda/4n$ respectively, where N is an odd number, $\lambda$ is the central wavelength of respective light passing through the regions of the color film layer with different colors, and n is the refractive index of the transparent insulating layer.

Optionally, the transparent insulating layer is manufactured with a material mixed with a $Nb_2O_5$ material and a $SiO_2$ material.

Optionally, the $Nb_2O_5$ material comprises $Nb_2O_5$ particles with a diameter of 6 nm, and the $SiO_2$ material comprises $SiO_2$ particles with a diameter of 40 nm.

Optionally, the method further comprises: forming a planarization layer on a light output surface of the touch electrode wire pattern and the light output surface of the transparent insulating layer.

In a third aspect, an embodiment of the present invention provides a display device comprising the above mentioned color film substrate.

The color film substrate provided by the embodiment of the invention effectively weakens the brightness difference line caused by the touch electrode wire pattern.

DETAILED DESCRIPTION OF THE INVENTION

In the following, the technical solutions in embodiments of the invention will be described clearly and completely in connection with the drawings in the embodiments of the invention. Obviously, the described embodiments are only part of the embodiments of the invention, and not all of the embodiments. Based on the embodiments in the invention, all other embodiments obtained by those of ordinary skills in the art under the premise of not paying out creative work pertain to the protection scope of the invention.

Figure 1:
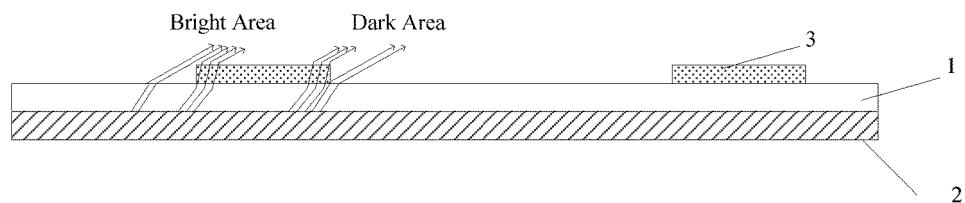
FIG. 1 is a structural schematic diagram of a color film substrate in the prior art.
Figure 2:
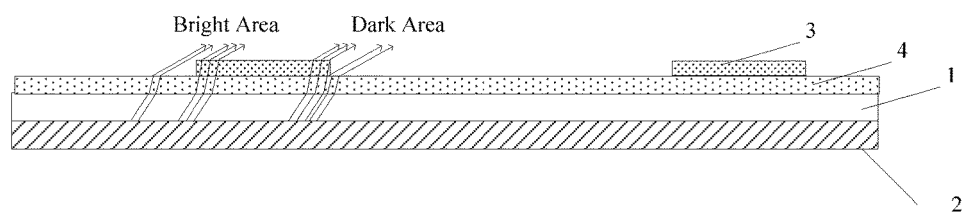
FIG. 2 is a structural schematic diagram of a color film substrate provided by an embodiment of the present invention.

An embodiment of the present invention provides a color film substrate. As shown in FIG. 2, the color film substrate comprises a basal substrate 1, a color film layer 2 formed on the basal substrate 1, a transparent insulating layer 4 formed on a upper surface of the basal substrate 1, and a touch electrode wire pattern 3 formed on the transparent insulating layer 4; the refractive index of the transparent insulating layer 4 is consistent with the refractive index of the touch electrode wire pattern 3.

Referring to FIG. 2, compared with the prior art, the transparent insulating layer 4 formed on the basal substrate 1 has a refractive index consistent with the refractive index of the touch electrode wire pattern 3. A part of light emitted from the right periphery of the touch electrode wire pattern 3 can be shifted to the left, compensating the light in this region, increasing the light in the dark area, thereby increasing the brightness of the dark area. Accordingly, a part of light emitted from the left periphery of the touch electrode wire pattern 3 can also be shifted to the left, decreasing the light in the bright area, thereby decreasing the brightness of the bright area. In this way, the brightness difference line caused by the touch electrode wire pattern can be effectively weakened.

Optionally, in an embodiment of the present invention, the thickness of the transparent insulating layer is $N\lambda/4n$, where N is an odd number, $\lambda$ is the central wavelength of the output light, and n is the refractive index of the transparent insulating layer.

In practical applications, the touch electrode wire pattern 3 is typically manufactured with transparent materials such as ITO; however, there is still a loss for the light passing through the touch electrode wire pattern 3 due to some reasons such as reflection. This is one of the reasons causing the brightness difference line. In the embodiment of the present invention, the thickness of the regions of the transparent insulating layer corresponding to regions of the color film layer with a output wavelength of $\lambda$ is set as odd times of $\lambda/4$; in such a manner, destructive interference occurs for the light reflected by the two surfaces of the transparent insulating layer. Therefore, the brightness of the output light can be enhanced, compensating the loss of light due to reflection. The brightness difference line caused by the touch electrode wire pattern can be further weakened.

It should be noted that since the colors of light emitted from the color film layer 2 may be different with each other, the wavelengths are also different with each other. Therefore, the thickness of regions of the transparent insulating layer corresponding to regions of the color film layer with different colors can be varied, thereby causing destructive interference for the reflected light with every color. Optionally, the thickness of regions of the transparent insulating layer corresponding to regions of the color film layer with different colors is $N\lambda/4n$ respectively, where N is an odd number, $\lambda$ is the central wavelength of respective light passing through the regions of the color film layer with different colors, and n is the refractive index of the transparent insulating layer.

In practical applications, the touch electrode wire pattern can be made of ITO material. In this case, the transparent insulating layer is manufactured with a material mixed with a $Nb_2O_5$ material and a $SiO_2$ material. In particular, the $Nb_2O_5$ material comprises $Nb_2O_5$ particles with a diameter of 6 nm, and the $SiO_2$ material comprises $SiO_2$ particles with a diameter of 40 nm.

Certainly, as long as the refractive index of the transparent insulating layer 4 is consistent with the refractive index of the touch electrode wire pattern 3, the specific material applied for the transparent insulating layer will not affect the scope of the invention.

In practical applications, the touch electrode wire pattern 3 can comprises a Tx electrode wire pattern and/or an Rx electrode wire pattern.

Figure 3:
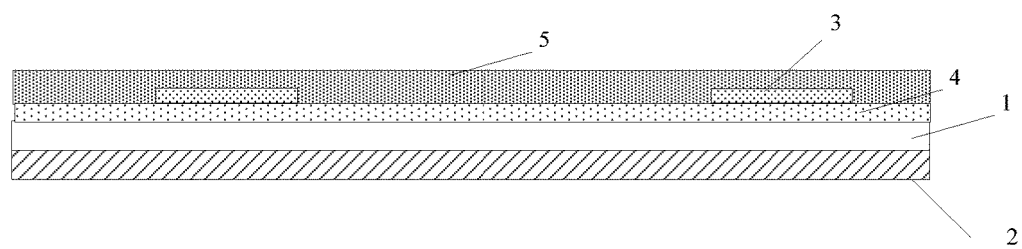
FIG. 3 is a structural schematic diagram of a color film substrate provided by another embodiment of the present invention.

FIG. 3 is a structural schematic diagram of a color film substrate provided by another embodiment of the present invention. Compared with FIG. 2, the color film substrate further comprises a planarization layer 5 formed on a light output surface of the touch electrode wire pattern 3 and the light output surface of the transparent insulating layer 4. In practical applications, such a configuration is advantageous for adhering optical films such as polarizer. Moreover, the planarization layer can be manufactured with adhesive glue, which is conducive for adhering optical films.

It should be noted that though the above mentioned embodiments are illustrated with the color film layer 2 and the transparent insulating layer 4 being arranged on two opposite sides of the basal substrate 1, the color film layer 2 and the transparent insulating layer 4 can also be arranged on the same side of the basal substrate 1. The transparent insulating layer 4 can be located on the light output surface of the color film layer 2; the touch electrode wire pattern 3 can be located on the light output surface of the transparent insulating layer 4; in such a manner, the brightness difference line caused by the touch electrode wire pattern can be effectively weakened. These embodiments also pertain to the protection scope of the invention.

In a second aspect, an embodiment of the present invention provides a method for manufacturing the above mentioned color film substrate. The method comprises: forming a color film layer on a basal substrate; forming a transparent insulating layer on a light output surface of the color film layer; and forming a touch electrode wire pattern on a light output surface of the transparent insulating layer; the refractive index of the transparent insulating layer is consistent with the refractive index of the touch electrode wire pattern.

The color film substrate manufactured by the method according to the embodiment of the invention effectively weakens the brightness difference line caused by the touch electrode wire pattern.

In a specific implementation, forming a transparent insulating layer on a light output surface of the color film layer comprises: forming a transparent insulating layer on a surface of the basal substrate departing from the color film layer.

In a specific implementation, the thickness of the transparent insulating layer is Nλ/4n, where N is an odd number, λ is the central wavelength of the output light, and n is the refractive index of the transparent insulating layer.

In a specific implementation, the thickness of regions of the transparent insulating layer corresponding to regions of the color film layer with different colors is Nλ/4n respectively, where N is an odd number, λ is the central wavelength of respective light passing through the regions of the color film layer with different colors, and n is the refractive index of the transparent insulating layer.

Optionally, the transparent insulating layer is manufactured with a material mixed with a $Nb_2O_5$ material and a $SiO_2$ material.

Optionally, the $Nb_2O_5$ material comprises $Nb_2O_5$ particles with a diameter of 6 nm, and the $SiO_2$ material comprises $SiO_2$ particles with a diameter of 40 nm.

Optionally, the method further comprises: forming a planarization layer on a light output surface of the touch electrode wire pattern and the light output surface of the transparent insulating layer.

In another aspect, an embodiment of the present invention provides a display device comprising the above mentioned color film substrate.

The display device can be any product or component with display function, such as mobile phone, tablet computer, TV, display, notebook computer, digital photo frame and navigator.

Apparently, the person skilled in the art may make various alterations and variations to the invention without departing the spirit and scope of the invention. As such, provided that these modifications and variations of the invention pertain to the scope of the claims of the invention and their equivalents, the invention is intended to embrace these alterations and variations.

What is claimed is:

1. A color film substrate comprising: a basal substrate, a color film layer formed on the basal substrate, a transparent insulating layer formed on a light output surface of the color film layer, and a touch electrode wire pattern formed on a light output surface of the transparent insulating layer; the refractive index of the transparent insulating layer being consistent with the refractive index of the touch electrode wire pattern, wherein portions of the transparent insulating layer corresponding to regions of the color film layer of different colors have different thicknesses, wherein the transparent insulating layer weakens a brightness difference line.

2. The color film substrate according to claim 1, wherein the color film layer is formed on a first surface of the basal substrate; and wherein the transparent insulating layer is formed on a second surface of the basal substrate departing from the color film layer.

3. The color film substrate according to claim 1, wherein the thickness of regions of the transparent insulating layer corresponding to regions of the color film layer with different colors is Nλ/4n respectively, where N is an odd number, λ is the central wavelength of respective light passing through the regions of the color film layer with different colors, and n is the refractive index of the transparent insulating layer.

4. The color film substrate according to claim 1, wherein the transparent insulating layer is manufactured with a material mixed with a $Nb_2O_5$ material and a $SiO_2$ material.

5. The color film substrate according to claim 4, wherein the $Nb_2O_5$ material comprises $Nb_2O_5$ particles with a diameter of 6 nm, and the $SiO_2$ material comprises $SiO_2$ particles with a diameter of 40 nm.

6. The color film substrate according to claim 1, further comprising a planarization layer; wherein the planarization layer covers a light output surface of the touch electrode wire pattern and the light output surface of the transparent insulating layer.

7. A method for manufacturing the color film substrate according to claim 1, comprising:
   forming a color film layer on a basal substrate;
   forming a transparent insulating layer on a light output surface of the color film layer; and
   forming a touch electrode wire pattern on a light output surface of the transparent insulating layer; the refractive index of the transparent insulating layer being consistent with the refractive index of the touch electrode wire pattern.

8. The method according to claim 7, wherein forming a transparent insulating layer on a light output surface of the color film layer comprises:
   forming a transparent insulating layer on a surface of the basal substrate departing from the color film layer.

9. The method according to claim 7, wherein the thickness of regions of the transparent insulating layer corresponding to regions of the color film layer with different colors is Nλ/4n respectively, where N is an odd number, λ is the central wavelength of respective light passing through the regions of the color film layer with different colors, and n is the refractive index of the transparent insulating layer.

10. The method according to claim 7, wherein the transparent insulating layer is manufactured with a material mixed with a $Nb_2O_5$ material and a $SiO_2$ material.

11. The method according to claim 10, wherein the $Nb_2O_5$ material comprises $Nb_2O_5$ particles with a diameter of 6 nm, and the $SiO_2$ material comprises $SiO_2$ particles with a diameter of 40 nm.

12. The method according to claim 7, further comprising: forming a planarization layer on a light output surface of the touch electrode wire pattern and the light output surface of the transparent insulating layer.

13. A display device comprising the color film substrate according to claim 1.

14. The display device according to claim 13, wherein the color film layer is formed on a first surface of the basal substrate; and wherein the transparent insulating layer is formed on a second surface of the basal substrate departing from the color film layer.

15. The display device according to claim 13, wherein the thickness of regions of the transparent insulating layer corresponding to regions of the color film layer with different colors is Nλ/4n respectively, where N is an odd number, λ is the central wavelength of respective light passing through the regions of the color film layer with different colors, and n is the refractive index of the transparent insulating layer.

16. The display device according to claim 13, wherein the transparent insulating layer is manufactured with a material mixed with a $Nb_2O_5$ material and a $SiO_2$ material.

17. The display device according to claim 16, wherein the $Nb_2O_5$ material comprises $Nb_2O_5$ particles with a diameter of 6 nm, and the $SiO_2$ material comprises $SiO_2$ particles with a diameter of 40 nm.

* * * * *